(12) United States Patent
Koppetz et al.

(10) Patent No.: US 9,420,150 B2
(45) Date of Patent: Aug. 16, 2016

(54) ELECTRONIC CAMERA

(71) Applicant: Arnold & Richter Cine Technik GmbH & Co. Betriebs KG, Munich (DE)

(72) Inventors: Michael Koppetz, München (DE); Timo Sperber, Munich (DE)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 0 days.

(21) Appl. No.: 14/472,904

(22) Filed: Aug. 29, 2014

(65) Prior Publication Data

US 2015/0070573 A1    Mar. 12, 2015

(30) Foreign Application Priority Data

Sep. 10, 2013   (DE) .......................... 10 2013 218 098

(51) Int. Cl.
  *H04N 5/225*   (2006.01)
  *G03B 17/02*   (2006.01)

(52) U.S. Cl.
  CPC .................................. *H04N 5/2252* (2013.01)

(58) Field of Classification Search
  CPC .............................. H04N 5/2252; G03B 17/02
  USPC .......................................... 348/373–376, 143
  See application file for complete search history.

(56) References Cited

U.S. PATENT DOCUMENTS

| | | | |
|---|---|---|---|
| 4,485,407 A | 11/1984 | Bohm et al. | |
| 4,673,267 A | 6/1987 | Erxleben | |
| 5,563,659 A | 10/1996 | Bernhardt et al. | |
| 5,870,641 A | 2/1999 | Chrosziel | |
| 6,686,967 B1 | 2/2004 | Yamamoto | |
| 7,841,784 B2 * | 11/2010 | Elias | G03B 17/566 248/187.1 |
| 2004/0174457 A1 * | 9/2004 | Ma | A44B 11/125 348/373 |
| 2006/0146180 A1 * | 7/2006 | Nakamura | H04N 5/2251 348/375 |
| 2006/0146181 A1 * | 7/2006 | Nakamura | H04N 5/2251 348/375 |
| 2008/0198253 A1 * | 8/2008 | Yanagisawa | H04N 5/225 348/333.01 |

FOREIGN PATENT DOCUMENTS

| | | |
|---|---|---|
| DE | 31 44 275 C1 | 4/1983 |
| DE | 35 20 459 A1 | 12/1986 |
| DE | 4400475 C1 | 12/1994 |
| DE | 296 13 027 U1 | 9/1996 |
| DE | 198 39 218 A1 | 3/1999 |
| DE | 20 2007 012 660 U1 | 9/2008 |
| JP | 62061035 | 3/1987 |
| JP | 03124173 A | 5/1991 |
| JP | 05145816 B2 | 6/1993 |
| JP | 2006128847 A | 5/2006 |

OTHER PUBLICATIONS

Search Report dated Feb. 27, 2014 for DE 10 2013 218 098.5.
Panavised Sony PMW-F55 Brochure.
U.S. Appl. No. 29/466,726, filed Sep. 11, 2013.

* cited by examiner

*Primary Examiner* — Nhan T Tran
*Assistant Examiner* — Marly Camargo
(74) *Attorney, Agent, or Firm* — Dinsmore & Shohl LLP; Douglas W. Sprinkle

(57) ABSTRACT

An electronic video camera comprises a camera body which has an objective connection for interchangeable objectives as well as at least one first side surface and one second side surface, wherein the objective connection defines a visual axis of the video camera. A first longitudinal guide is integrated into the first side face of the camera body and extends in parallel with the visual axis and a second longitudinal guide is integrated into the second side face of the camera body and extends in the same respect in parallel with the visual axis.

24 Claims, 3 Drawing Sheets

ELECTRONIC CAMERA

CROSS-REFERENCE TO RELATED APPLICATIONS

This application claims priority of German Patent Application DE102013218098.5 filed on Sep. 10, 2013.

FIELD OF THE INVENTION

The present invention relates to an electronic video camera (also referred to as an electronic movie camera) comprising a camera body which has an objective connection for interchangeable objectives as well as at least one first side face and one second side face, wherein the objective connection defines a visual axis of the camera (i.e. an axis of vision of the camera).

BACKGROUND OF THE INVENTION

The camera bodies of known electronic video cameras are typically parallelepiped-shaped and have at a front side face a usually circular objective connection which defines a visual axis of the camera (central surface normal on the plane of extent of the objective connection) by its alignment. The visual axis thus corresponds to the axis of the light incidence, wherein the light incident through the objective connection acts on at least one image sensor in the interior of the camera body without deflection directly or indirectly via optical elements (e.g. deflection prisms).

The camera body can have a carrier handle at an upper side via which the camera can be carried from above for supporting the camera during a recording of image data. Alternatively or additionally, a shoulder support can be provided at a lower side of the camera by means of which the camera can be supported on the shoulder of a cameraman.

In addition to such fundamental holding devices, a variety of special further holding devices are known, such as tripods, steadycams, camera suspensions and camera cranes. Such holding devices can be screwed to the camera body, in particular via a standardized thread at a lower side face of the camera body.

With such holding devices rigidly connected to the camera body such as a carrier handle formed integrally at the camera body or a tripod screwed to a defined point of the camera body, the support point of the camera is fixedly defined. This has the disadvantage that no adaptation of the support to weight shifts of the camera is possible. Such weight shifts can in particular result on the use of different objectives of different lengths and different weights as well as on the attachment of different accessory devices such as a matte box and/or a focus pulling device which are arranged at or in front of the respective objective.

For a more variable support of the camera, adapter plates, so-called base plates, can be used which can be rigidly connected, in particular screwed, to the camera body and which can have connection possibilities for holding devices in different positions. For example, corresponding connection possibilities can be provided at different points of the adapter plate. The adapter plate can, however, in particular have a longitudinal guide for the lengthways variable arrangement of a holding device. Furthermore, the adapter plate can serve for further connection possibilities for fastening accessory devices for the camera.

The disadvantage of such an adapter plate is an increased construction complexity since a further components has to be taken along and connected to the adapter plate in addition to the camera itself and any accessory devices. In addition, tolerance chains can be produced on the mechanical connection of the adapter plate to the camera body as well as of a respective holding device to the adapter plate so that the total camera system can have an increased mechanical clearance. In addition, there is the fact that the camera body of known video camera typically only has one single connection for holding devices in the form of a standardizes thread at a lower side face of the camera body so that only one single adapter plate can be screwed to the camera body. On a use of different holding devices, they therefore each have to be connected to the same adapter plate and are thus as a rule coupled to the lower side face of the camera body, while further side faces of the camera body remain unused. The flexibility in the setup of the camera system is thereby in particular restricted.

SUMMARY OF THE INVENTION

It is therefore an object of the invention to provide an electronic video camera which provides a variety of connection possibilities for a variable and stable arrangement of accessory devices for the camera which avoids longer tolerance chains.

The object is satisfied by an electronic video camera having the features of claim 1 and in particular in that a first longitudinal guide is integrated into the first side face of the camera body and extends in parallel with the visual axis of the camera and in that a second longitudinal guide is integrated into the second side face of the camera body and extends in parallel with the visual axis.

In other words, the camera body has a respective longitudinal guide directly at at least two of its side faces. In this respect, both longitudinal guides are an integral component of the camera body. This means that the parts of the camera body having the longitudinal guides are necessary so that the camera body is complete and closed. The respective longitudinal guide is in this respect formed in one part with the associated side face or is arranged in another matter as a permanent component in or at the associated side face. In this respect, a surface is in particular called a side face of the camera body which is a component of the housing of the camera, i.e. the side face forms a termination surface of the camera body which closes an interior space of the camera body. The named side faces can comprise an upper side face, a lower side face, a left side face and/or a right side face of the camera body.

The named longitudinal guides make it possible to fasten an accessory device, in particular a holding device, coupled to the camera body by means of the longitudinal guide to the camera body in a variable longitudinal position. For this purpose, the accessory device to be fastened can, for example, first be moved in a translatory manner in parallel with the visual axis in the longitudinal guide until the desired longitudinal position is reached and can subsequently be fixed in this longitudinal position. The longitudinal guide can, for example, be formed as continuous so that the accessory device can be fixed in any desired longitudinal position—at least within a certain range of the longitudinal adjustability. The longitudinal guide can, however, also allow a fixing only at discrete longitudinal position—at least within a certain range of the longitudinal adjustability—that is in accordance with a predefined pattern.

The longitudinal guide extends in a straight line in the direction parallel to the visual axis and in this respect in particular has at least one recess and/or one elevated portion. Such a recess can be formed in the manner of a groove, for example; an elevated portion can, for example, be formed by a rail, in particular a rail having a profile.

Furthermore, the longitudinal axis can have a front end and a rear end with respect to its longitudinal extent parallel to the visual axis and can either be open at both ends or can be closed at both ends or can be open at one end and closed at the other end. With a longitudinal guide which is closed at both ends, an accessory device to be fastened can be inserted into the longitudinal guide transversally to the longitudinal extent of the longitudinal guide. Provision can be made with a longitudinal guide which is open at at least one end that an accessory device to be fastened is pushed into the longitudinal guide or removed from the longitudinal guide also or only longitudinally in the direction of the longitudinal extent of the longitudinal guide.

The longitudinal guide can in particular be a linear slide guide in which the accessory device to be fastened can be moved linearly before the fixing of the longitudinal position.

The camera body of the video camera has at least one respective longitudinal guide both at a first side face and at a second side face, with one or more accessory devices of the camera being able to be coupled with the camera body via said longitudinal guide. In this manner, a particularly variable arrangement of camera accessories at the video camera is possible. On the one hand, accessory devices can be connected to the camera body at two different side faces. A plurality of accessory devices can in particular hereby be simultaneously fastened to the camera body and adjusted with respect to one another or relative to the camera body or to a camera objective installed thereat without impeding one another. On the other hand, the fastening of the accessory devices is not fixed at a fixedly predefined position by a connection at the camera body, but can rather be selected variably along the longitudinal extent of the longitudinal guide. A variety of arrangement possibilities for accessory devices are thus provided and the flexibility in the setup of a camera system is substantially increased.

A high stability of the fastening is simultaneously ensured by the integral formation of the longitudinal guides into the respective side surface of the camera body due to the direct coupling of the respective accessory device to the camera body.

Since the longitudinal position, that is the positioning in the direction parallel to the visual axis is variable, accessory devices can also be adjusted precisely via corresponding side arms in a position in front of or behind the camera body. This is in particular important with accessory devices which have an influence on the light penetrating into the camera. In addition, attachments in front of or behind the camera can produce transpositions in the center of gravity to the front or (more rarely) to the rear with respect to the visual axis. By fastening a holding device for the camera by means of one of the longitudinal guides, such a transposition in the center of gravity can be compensated in a simple manner in that the longitudinal position of the holding devices is adapted to the changed center of gravity, as will be explained in more detail in the following.

The first side face and the second side face preferably lie on mutually opposite sides of the camera body. Respective accessory devices can thereby be connected to the camera at opposite sides of the camera body and the space around the camera can thus be utilized particularly favorably without the respective accessory devices impeding one another. In addition, it is preferred for the first and second side faces to be aligned in parallel with one another.

It is furthermore advantageous if the first side face is formed by a lower side face of the camera body and the second side face is formed by an upper side face of the camera body. In this respect, alignments such as "top" and "bottom" and the like are defined by a normal operation alignment in which the camera is typically held in use and/or with respect to which the design and in particular the lettering or displays at the camera are aligned.

With such an embodiment of the video camera, accessory devices to be connected to the camera body can therefore be connected to the camera body at the top and at the bottom. This is in particular advantageous if the accessory devices are holding devices by means of which the camera is carried or is held in a lying orientation. In addition, the accessibility of the camera from the lateral side faces (left and right side faces) of the camera body is not impeded by the arrangement of accessory devices at an upper side face or at a lower side face of the camera body.

In accordance with an advantageous embodiment, the camera body comprises a housing, with the first side face being a bottom plate of the housing and/or the second side face being a top plate of the housing. The first and/or second side faces are thus direct components of the housing. The first and/or second longitudinal guides, which are integrated into the respective associated side face, are accordingly likewise formed as components of the housing.

The housing forms that part of the camera body which outwardly terminates an interior space of the camera body by means of termination surfaces. The termination surfaces therefore form direct boundary surfaces between this interior space and the outer environment of the camera. For example, the named image sensor, associated readout electronics, image data processing electronics, control electronics, a cooling device and/or a memory device of the camera can be located in the interior space of the camera body.

In accordance with this embodiment, the named bottom plate and/or the named top plate are thus formed as termination surfaces of the camera body. The bottom plate and/or the top plate of the housing is/are therefore not cover elements only placed onto the actual termination surfaces. A side face with an integrated longitudinal guide of the camera in accordance with the invention hereby differs from an adapter plate of the initially explained kind which is not a side face of the camera body and in particular is not a bottom plate and/or top plate of the housing, but is rather only placed onto the housing of the camera.

Such an integral configuration of the longitudinal guides into a bottom plate and/or top plate of the housing of the camera body allows a particular stability of the fastening of accessory devices, in particular of holding devices at the camera. Due to the direct coupling of a respective accessory device to such a longitudinal guide formed integrally in the housing of the camera body, the tolerance chain of the mechanical clearance is minimal and the fastening is thus particularly reliable. Furthermore, compact dimensions of the camera body are hereby made possible, in particular a small height. The camera body can thus have a low center of gravity, which is particularly important, for example, when the camera is carried on the shoulder, i.e. when a shoulder support is installed as an accessory device at the bottom plate of the housing of the camera body.

In accordance with an advantageous embodiment, the named first side face and the named second side face of the camera body can be formed in one part with one another, whereby the longitudinal guides are aligned particularly rigidly relative to one another. The first side face and the second side face of the camera body can, however, also be connected to one another indirectly via a carrier structure of the camera body.

It is furthermore preferred if the named longitudinal guides are formed compatible with one another. In this embodiment, the same accessory devices can therefore be selectively fastened to the camera body at the first longitudinal guide or at the second longitudinal guide. The longitudinal guides can therefore be swapped over functionally in this respect. The longitudinal guides can in particular have the same cross-section profile. Due to the use of compatible longitudinal guides, a respective accessory device cannot only be arranged at the camera body variably with respect to its longitudinal position, but also variably with respect to the respective side face of the camera body whose longitudinal guide is used for fastening the accessory device.

In accordance with a further embodiment, the camera body has a third side face into which a third longitudinal guide is integrated which likewise extends in parallel with the visual axis of the camera. The third longitudinal guide is in particular compatible with the first longitudinal guide and with the second longitudinal guide. In this respect, the named third side face can in particular be perpendicular to the first side face and perpendicular to the second side face. Respective longitudinal guides integrated into the camera body are thus provided at a total of three side faces of the camera body so that connection possibilities for accessory devices are provided at three sides of the camera body. This allows a particularly variable fastening of accessory devices to the camera in different alignments and in particular at different longitudinal positions with respect to the visual axis of the camera.

Furthermore, a fourth longitudinal guide can be integrated into a fourth side face of the camera body; it extends in parallel with the visual axis of the camera and is in particular compatible with the third longitudinal guide. In this respect, the fourth side face can be disposed opposite the named third side face.

In accordance with an advantageous embodiment, the first longitudinal guide and the second longitudinal guide have the same spacing from the visual axis of the camera. Provided further longitudinal guides are provided, they can likewise have the same spacing from the visual axis of the camera (pairwise among one another and/or with respect to the first and second longitudinal guides). It is made possible by the identical spacing from the visual axis that accessory devices, for the function of which their relative position with respect to the visual axis is important (in particular accessory devices which project at least partly into the visual axis of the camera), can be released from one of the longitudinal guides and can be inserted into another longitudinal guide without the relative alignment with respect to the visual axis of the camera having to be reset. The respective longitudinal guides can in particular be arranged rotationally symmetrically, at least pairwise, to the visual axis of the camera.

It is furthermore preferred if at least one of the named longitudinal guides is formed as a dovetail guide, in particular as a dovetail groove. All of the longitudinal guides are preferably formed as similar dovetail guides. A dovetail guide represents a constructionally simple and functionally reliable form of a longitudinal guide. In this respect, counter-elements, in particular dovetail webs, which can be coupled to the longitudinal guides at the different accessory devices in a simple manner, are provided by means of which the accessory devices are then guided and fixed in a respective longitudinal guide.

In principle, the fixing of a respective accessory device in a respective longitudinal guide can take place in different manners. For example, at least one of the named longitudinal guides can have a clamping device: alternatively or additionally, such a clamping device can also be provided at a respective accessory device. Furthermore, provision can be made for the reduction of the friction that at least one of the named longitudinal guides has slide elements and/or roller elements. In addition, at least one of the named longitudinal guides can have elastic elements by which in particular an accessory device guided in the longitudinal guide can be clamped or by which a clamping device or another fastening device can be preloaded into a fixing position or into a release position. In addition, at least one of the named longitudinal guides can have a scale device which can in particular serve to be able display or set the exact longitudinal position of an accessory device.

In accordance with a further embodiment, the width of at least one of the named longitudinal guides corresponds to at least half the width of the associated side face of the camera body. In this respect, width is to be understood as the extent of the longitudinal guide perpendicular to the longitudinal extent (i.e. perpendicular to the direction of the visual axis) and substantially in parallel with the associated side face. Mechanical clearance in the peripheral direction toward the visual axis of the camera can advantageously be avoided by such a comparatively wide design of the longitudinal guide. Such an embodiment therefore provides an improved stability.

In a further advantageous embodiment, at least one of the named longitudinal guides extends over at most 80% of the length of the associated side face of the camera body. The length of the side face in this respect corresponds to the extent of the side face in the direction of the visual axis. The variability of the positioning in the longitudinal direction is admittedly slightly restricted by the restriction of the length of the longitudinal guide to at most 80% of the length of the associated side face. However, due to the typically elongate shape of the camera body, such a length of the longitudinal guide will probably suffice for a comprehensive range of applications. This applies all the more if, for example, the accessory device itself is elongate and can therefore, or in another manner, project beyond the longitudinal extent of the longitudinal guide without the reliability of the fastening thereby being impaired. In addition, the advantage is produced with this embodiment that the remaining section of the side face which therefore has no longitudinal guide can be utilized for other purposes and can, for example, have electrical connections, a closable opening for batteries a memory device and/or operating elements.

In a further embodiment, the second longitudinal guide extends over at least a third of the length of the second side face of the camera body. In this respect, the second side face is in particular a lower side face of the camera body. It is thus ensured that the longitudinal guide has a sufficient minimum dimension of length variability for the arrangement of accessory devices at a lower side face of the camera body. If, for example, an accessory device fastened to the camera by means of the second longitudinal guide is a holding device, in particular a shoulder support, this holding device can be adjustable in accordance with the longitudinal extent of the longitudinal guide to be able to adapt the support of the camera to different demands, in particular to different distributions of weight of the camera.

In a further development of the video camera, at least one of the named longitudinal guides has a plurality of engagement sections along its longitudinal extent which define a pattern for a shaped-matched fixing of a respective accessory device in different predefined longitudinal positions. The engagement sections can, for example, be formed as recesses or as holes in the profile of the respective longitudinal guide into which corresponding counter-sections of the accessory device can engage to fix the accessory device with shape matching. The engagement sections of the respective longitudinal guide and corresponding counter-sections at the accessory device to be fixed can in particular directly interact with one another, for example, when the counter-sections are formed by adjustable engagement elements such as pins. Additional fixing means can, however, also be provided which couple the engagement sections of the longitudinal guide to the counter-sections of the respective accessory device.

The named shape-matched fixing by means of the engagement sections can represent the only form of the fixing of a respective accessory device to the respective longitudinal guide or can also be provided in addition to other types of fixing, in particular in addition to a force-transmitting or friction-locking fixing of the accessory device, for example by clamping. Provided that both a force-transmitting or friction-locking fixing and the named shape-matched fixing are provided, the force-transmitting or friction-locking fixing can preferably allow a continuous adjustability of the longitudinal position of the accessory device. In this case, the shape-matched fixing in accordance with the named pattern supplements the continuous adjustment by defined longitudinal positions in which a respective accessory device can be fixed on the basis of the shape matching with particular stability and a precisely defined longitudinal position.

In a further embodiment, the camera has a first accessory device which can be moved along the first longitudinal guide of the camera body and which can be fixed in a variable longitudinal position at the first longitudinal guide and the camera has a second accessory device which can be moved along the second longitudinal guide of the camera body and which can be fixed in a variable longitudinal position at the second longitudinal guide.

In accordance with a further development, the camera has at least one holding device as a first or second or other accessory device which can be moved along the respective associated longitudinal guide and which can be fixed in a variable longitudinal position such that a balanced position of equilibrium of the camera can be set when the camera is held by means of the holding device. The support of the camera is in particular balanced when a support point of the camera lies vertically above or below the center of gravity of the camera or coincides therewith so that substantially no torque is exerted on the camera by gravity, in particular no torque on the basis of which the camera would tilt forward or rearward with respect to the visual axis.

In order therefore to be able to achieve a balanced position of equilibrium of the camera, the support point of the camera has to be substantially horizontally adjustable. This adjustability can advantageously be achieved by the use of a holding device guided in one of the longitudinal guides. The holding device can then be moved along the longitudinal guide so that its longitudinal position and thus the support point of the camera can be adapted to the center of gravity of the camera or of a total camera system.

The support of the camera can in particular be adapted after a change in the center of gravity of the camera, for example due to the attachment of accessory devices. In this respect, at least one of the named longitudinal guides can in particular make it possible also to move the support point of the camera beyond the longitudinal extent of the camera body so that the support point of the camera can, for instance, also lie in front of the camera in the direction of the visual axis of the camera. This is possible, for example, in that the holding device is preferably elongate and is guided at least partly in the associated longitudinal guide, but also partly projects to the front beyond the longitudinal extent of the camera body.

Furthermore, the first accessory device can be formed by a first holding device and the second accessory device can be formed by a second holding device, with the first holding device being able to be fixed to a lower side face and the second holding device being able to be fixed to an upper side face of the camera in a variable longitudinal position along the respective longitudinal guides. With such an embodiment, the camera can selectively be held, that is in particular carried or supported, by means of the holding device arranged at the upper side face of the camera body or by means of the holding device arranged at the lower side face of the camera body.

The first holding device can in particular comprise a shoulder support and/or a tripod connection and the second holding device can comprise a carrier handle and/or a viewfinder holder. If, for example, a shoulder support and a carrier handle are arranged at the camera, it is possible to swap in a simple and fast manner between different manners of use of the camera. For example, the camera can be placed onto the shoulder of the cameraman for a close-up shot of a person and can be subsequently taken off the shoulder and carried by means of the carrier handle, for instance for an environmental shot.

The named viewfinder holder can in particular also form a unit with the carrier handle or can be fastened to the carrier handle, with this fastening in turn being able to be longitudinally variable. Or the viewfinder holder can be directly fastened in a longitudinal guide at an upper side face of the camera body. Arranging the viewfinder holder at the camera in a manner movable in the longitudinal direction by means of the longitudinal guide is in particular advantageous in conjunction with a likewise longitudinally movable shoulder support. For in this manner, the viewfinder holder and the shoulder support can, on the one hand, be arranged relative to one another such that when the camera is placed on the shoulder of a cameraman, the viewfinder comes to lie in front of an eye of the cameraman. On the other hand, the viewfinder holder and the shoulder support can be longitudinally moved together such that the camera can lie in balance on the shoulder of a cameraman (even after a change to the center of gravity).

It is furthermore advantageous if the first holding device comprises a combined shoulder support and tripod connection. This holding device is then configured, on the one hand, to lie on the shoulder of a cameraman to support the camera in this manner; the holding device, on the other hand, simultaneously has one or more fastening sections by means of which it can be coupled, in particular in a shape-matched manner, to a tripod. For example, the shoulder support can be formed by an ergonomically shaped cushioning, wherein suitable connection sections by means of which the camera can be directly coupled to a respective tripod are formed in a stable manner at a front end and at a rear end of the shoulder support respectively extending downwardly away from the camera. It is possible with such a combined shoulder support with a tripod connection to swap fast and in a simple manner between a tripod-fixed shot and a shoulder-supported shot, whereby the camera can be used particularly flexibly.

In accordance with a further embodiment, a further longitudinal guide is integrated into the first holding device; it extends in parallel with the visual axis of the camera and is adapted to receive a further accessory device in a variable longitudinal position. In principle, an individual one of the named longitudinal guides can also receive a plurality of accessory devices at the same time, with these accessory devices having to share the available space in the longitudinal guide. To increase the connection possibilities for accessory devices or also to provide connection possibilities for accessory devices which require a different kind of longitudinal guide than the longitudinal guides integrated in the side faces, the first holding device can in turn have a longitudinal guide integrated in it. This longitudinal guide in this respect has to be distinguished from and is independent of the counter-element provided at the holding device for coupling with the longitudinal guide of the camera body.

The holding device can, for example, be arranged at the camera by means of a dovetail guide can in turn have a longitudinal guide in the form of two round bores into which carrier rods can be pushed and fixed in variable longitudinal positions. Such carrier rods can then serve as a carrier system for the arrangement of further accessory devices such as objective control devices, filters or a matte box at the camera.

It is furthermore also possible that the first accessory device (in particular the named first holding device) and the second accessory device (in particular the named second holding device) are mechanically connected to one another. A rigid connection can in particular be provided and/or a mechanical connection such that the two accessory devices can only be moved together longitudinally. The fact that the accessory devices or holding devices connected in this manner are nevertheless arranged at the camera both by means of the first longitudinal guide and the second longitudinal guide then primarily serves for an increase in the stability of this arrangement.

In accordance with a further advantageous embodiment, at least one the named accessory devices has a drive device to move the accessory device along the respective longitudinal guide with respect to a longitudinal arrangement. The drive device therefore serves to change the longitudinal position of the accessory device, with this being able to take place not purely mechanically, but rather only or at least assisted by the drive device. The accessory device can in this respect be moved in particular in a motorized and/or self-locking manner. In this manner, the longitudinal position of the accessory device can be changed particularly precisely, and optionally also remotely (remote control).

In accordance with another embodiment, at least one of the named longitudinal guides has a drive device to move a respective accessory device guided in the longitudinal guide with respect to a longitudinal arrangement. In a similar manner to the aforesaid embodiment, a drive device is provided with the embodiment which is, however, not provided or is not only provided at the respective accessory device, but at the longitudinal guide. The advantages of this embodiment are produced accordingly as in the aforesaid embodiment and in particular comprise the precise longitudinal positioning and the possibility of a remote adjustment of the accessory device.

In accordance with a further development, the drive device of the accessory device or the drive device of the longitudinal guide respectively is adapted to read out positional data associated with a respective accessory device from a memory device and to move the respective accessory device in dependence on the associated positional data with respect to a longitudinal arrangement. Accordingly, positional data associated with at least one respective accessory device are stored in the memory device. These positional data can, for example, be detected automatically or can, for instance, be detected using a scale after a first positioning of the accessory device and can be stored in the memory device. If the accessory device is again to be moved into the stored position after an interim movement or removal, the drive device can then read out the associated positional data from the memory device and can reestablish the stored longitudinal position of the accessory device.

A particularly comfortable positioning of the accessory devices is possible by such a cooperation of the drive device with the memory device. Complex arrangements of different accessory devices can thus advantageously also be restored after a conversion or dismantling of a camera system comprising a plurality of different accessory devices, for example to be able to reproduce a specific state of the camera system. The named memory device can be fixedly installed in the camera or can also be replaceable in the manner of a removable medium.

BRIEF DESCRIPTION OF THE DRAWINGS

The invention will be explained in the following only by way of example with reference to the drawings.

DETAILED DESCRIPTION OF THE PREFERRED EMBODIMENTS

Figure 1:
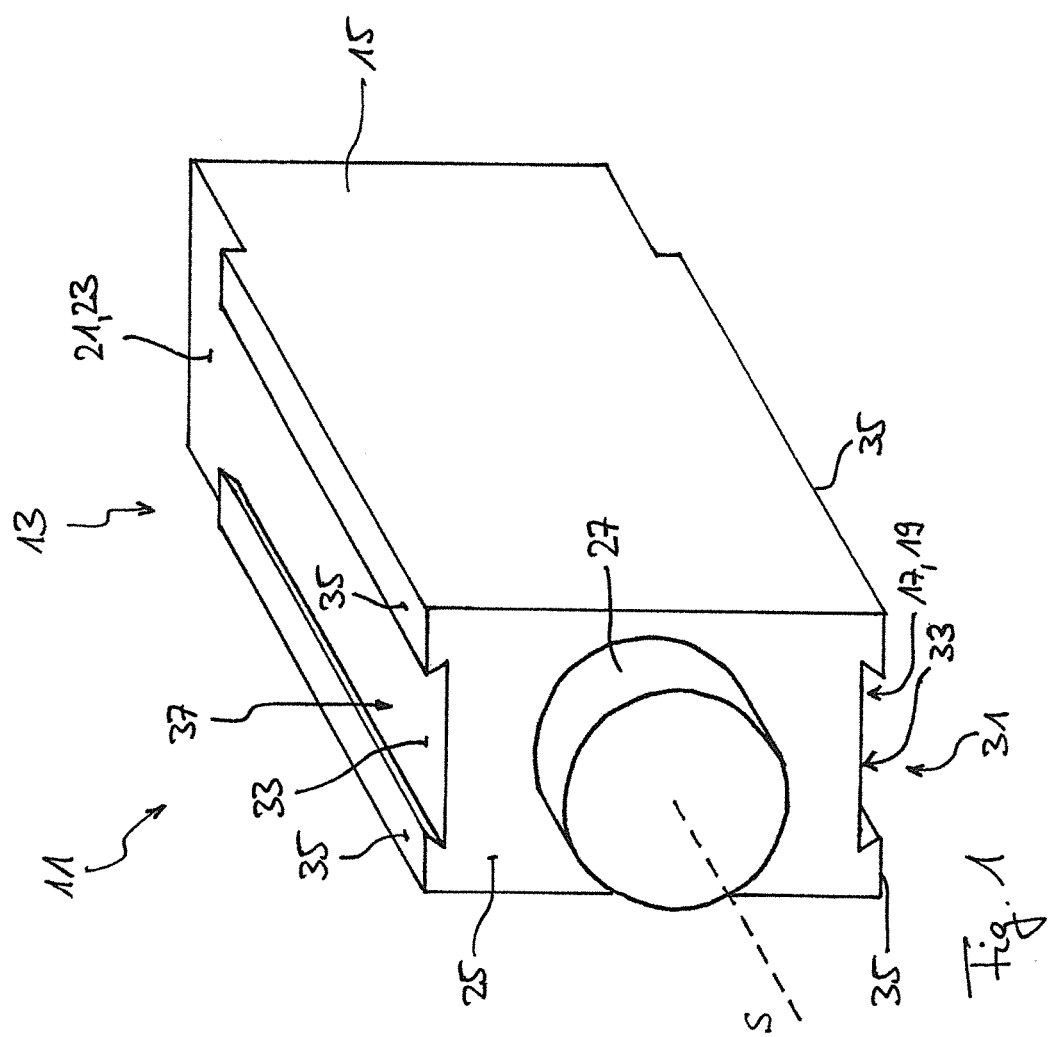
FIG. 1 shows an embodiment of an electronic video camera in accordance with the invention in a schematic perspective view.

The embodiment of an electronic video camera 11 shown schematically in FIG. 1 has a camera body 13 which is formed substantially parallelepiped-shaped. The camera body 13 comprises a housing 15 and has a first side face 17 which represents a lower side face of the camera body 13 and is formed as a base pate 19 of the housing 15 and comprises a second side face 21 which represents an upper side face of the camera body 13 opposite to the lower side face and is formed as a top plate 23 of the housing 15. At a front side face 25, the camera body 13 has an objective connection 27 which is here shown in simplified form as a cylinder and which has a substantially circular cross-section.

Figure 2:
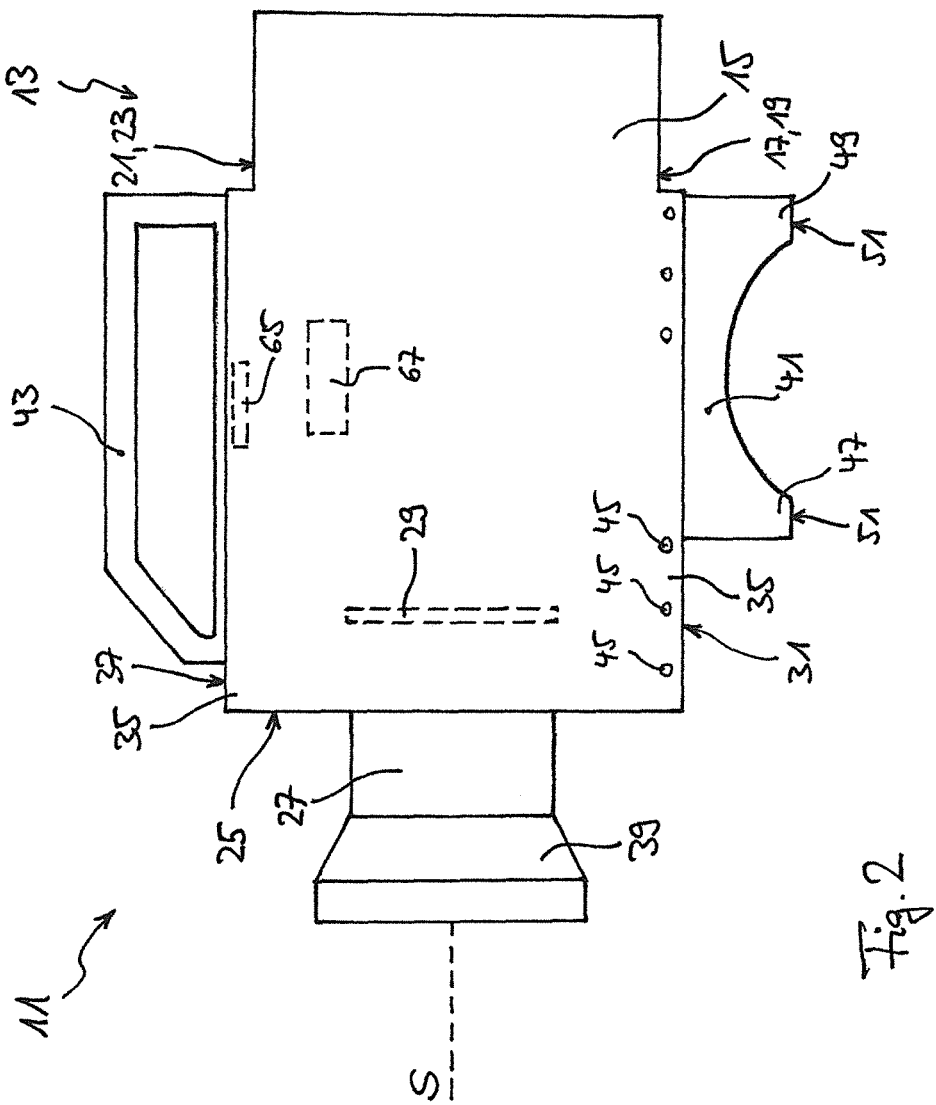
FIG. 2 shows an embodiment of an electronic video camera in accordance with the invention in a side view.
Figure 3:
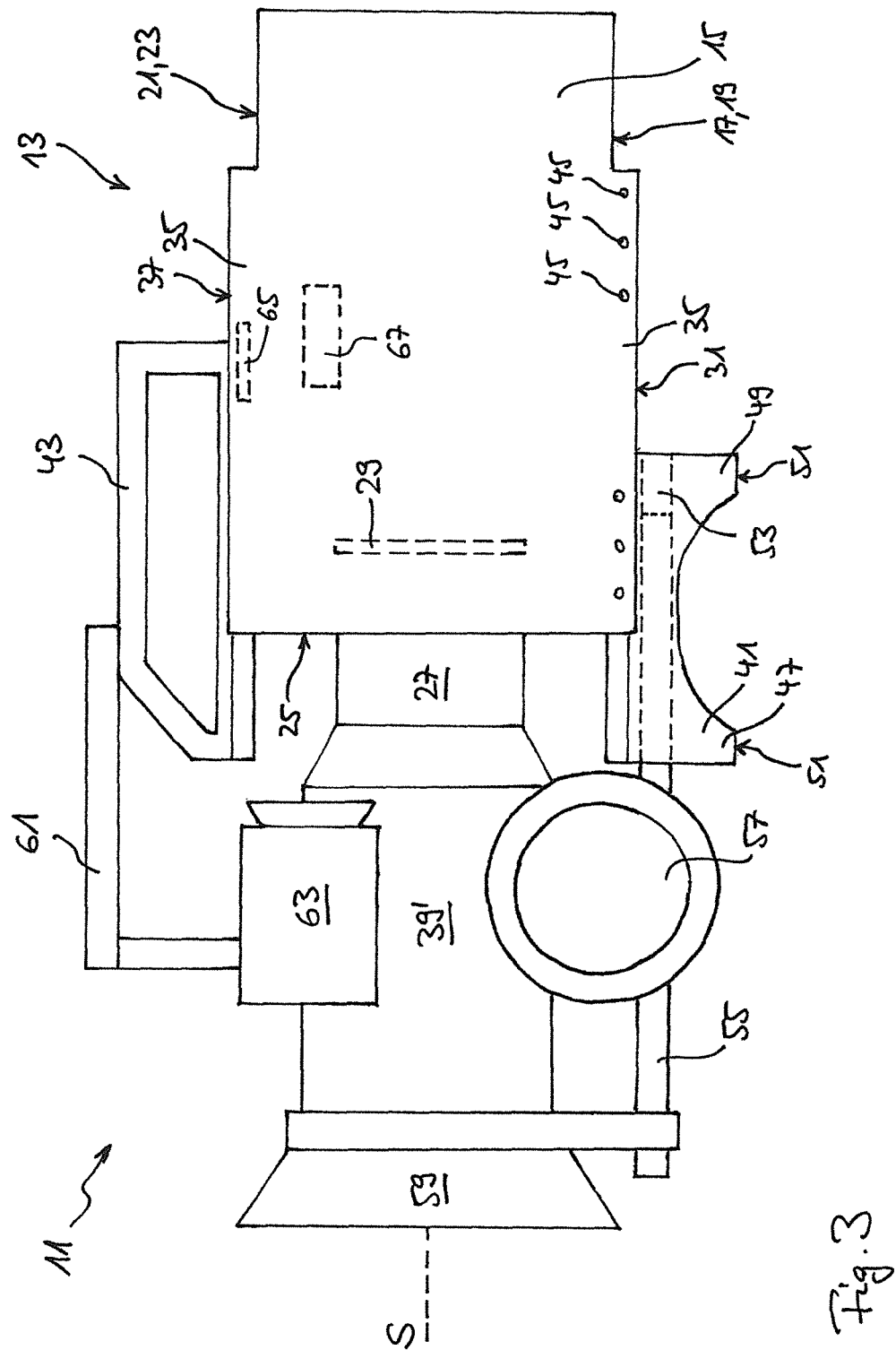
FIG. 3 shows the embodiment of an electronic video camera in accordance with the invention shown in FIG. 2 in a different state.

A beam path, not shown, runs in the interior of the camera 11 from the objective connection 27 to an image sensor 29 which is arranged within the housing 15 (cf. FIGS. 2 and 3; not shown in FIG. 1). The extension of this beam path outside the camera 11 defines a visual axis S which extends from the center of the objective connection 27 perpendicular to the cross-section of the objective connection 27.

A first longitudinal guide 31, which is designed as a dovetail groove 33 and which extends in parallel with the visual axis S, is integrated into the first side face 17 (i.e. into the bottom plate 19 of the housing 15). This means that an object (not shown in FIG. 1) guided in the longitudinal guide 31 can be moved substantially in parallel with the visual axis S. The groove 33 of the first longitudinal guide 31 and the rails 35 bounding the groove 33 to the sides in particular extend in parallel with the visual axis S.

A second longitudinal guide 37 is integrated into the second side face 21 (i.e. into the top plate 23 of the housing 15) and has the same profile as the first longitudinal guide 31 and is therefore compatible with it. In addition, the second longitudinal guide 37 also corresponds to the first longitudinal guide 31 with respect to the length in the direction of the visual axis S, with the longitudinal guides 31, 37 not extending over the total longitudinal extent of the respective side face 17 or 21 respectively of the camera body 13, but only over approximately two-thirds to three quarters of this longitudinal extent. Furthermore, the first and second longitudinal guides 31, 37 are substantially rotationally symmetrical with respect to one another with respect to the visual axis S so that they can be brought into coincidence with one another by an imaginary rotation by 180° about the visual axis S and can also coincide with one another with respect to the spacing from the visual axis S. The dovetail profile of the first and second longitudinal guides 31, 37 is particularly wide and comprises almost the total width of the respective side face 17 or 21 respectively less the width required for a sufficient stability of the rails 35. Accessory devices (not shown here) can thereby contact the respective side faces 17 and 21 respectively over a large area via dovetail webs of complementary shape and can thus be fastened particularly free of clearance.

The longitudinal guides 31, 37 are each integrated into the associated side face 17, 21; the first longitudinal guide 31 is therefore a permanent component of the bottom plate 19 of the housing 15 of the camera body 13 and the second longitudinal guide 37 is a permanent component of the top plate 23 of the housing 15 of the camera body 13. Specifically, in the embodiment shown, the first longitudinal guide 31 is formed in one part with the bottom plate 19 and the second guide 37 is formed in one part with the top plate 23. A particularly high stability of the fastening of the respective accessory device is produced due to the direct coupling of the respective accessory device with the camera body 13 (bottom plate 19 and top plate 23).

In FIG. 2, an embodiment of an electronic video camera 11 very similar to the embodiment shown in FIG. 1 is shown in a side view, with the same reference numerals marking mutually corresponding elements. The embodiment shown in FIG. 2 differs from the embodiment shown in FIG. 1 substantially by an objective 39 connected to the camera 11 via the objective connection 7 and by two holding devices fastened to the camera body 13. These holding devices comprise a shoulder support 41 guided in the first longitudinal guide 31 as well as a carrier handle 43 guided in the second longitudinal guide 37. Furthermore, the rails 35 of the first longitudinal guide 31 have engagement sections 45 in the form of bores which define a pattern for a shape-matched fixing of a respective accessory device (e.g. a shoulder support 41 and a carrier handle 43). Alternatively or additionally to the engagement sections 45, a respective clamping device (not shown) can be provided at the first longitudinal guide 31 and/or at the shoulder support 41. In addition, the image sensor 29 is schematically shown, with it only being drawn dashed to illustrate that it is arranged in an interior space of the camera body 13 and is actually not visible from the outside.

The two holding devices, i.e. the shoulder support 41 and the carrier handle 43 are arranged in the respective longitudinal guide 31, 37 with respect to their longitudinal positions and are fixed therein by fixing means, not shown, such that the camera 11 can be held in a balanced position of equilibrium. In this respect, the camera 11 can both be placed balanced on a shoulder (not shown) by means of the shoulder support 41 and can be carried by hand, balanced in the same respect, by means of the carrier handle 43.

The shoulder support 41 is a shoulder support 41 combined with a tripod connection. To be able to act as a tripod connection, the shoulder support 41 has a respective fastening section 51, which can be coupled to a tripod, not shown, at a front end 47 facing downwardly away from the camera 11 and a rear end 49 facing downwardly away from the camera 11. In this manner, the camera 11 can in turn be installed in a balanced position of equilibrium on a tripod without the shoulder support 41 having to be replaced with a separate tripod connection. The shoulder support 41 can moreover be fixed in a shape-matched manner in defined longitudinal positions by the engagement sections 45 (bores) of the first longitudinal guide 31 so that a particularly stable fixing of the shoulder support 41 in the longitudinal guide 31 is made possible in these longitudinal positions in order to prevent, for instance, a slipping of the camera 11 installed on a tripod or lying on a shoulder.

A drive device 65 (shown dashed as integrated into the rails) is provided in the rails 35 of the second longitudinal guide 37. The carrier handle 43 can be moved in a motorized and self-locking manner with respect to its longitudinal arrangement by means of this drive device 65. In addition, the drive device 65 is connected to a memory device 67 (likewise shown dashed) in the interior of the camera 11 in which positional data associated with the carrier handle 43 are stored. The drive device 65 can read out these positional data from the memory device 67 and can then move the carrier handle in dependence on the read out positional data. The displacement and fixing of the carrier handle 43 accordingly does not necessarily take place manually, but can also take place automatically and in particular initiated remotely. In addition, a longitudinal position of the carrier handle 43 previously set or at least defined at one time can thus be precisely reestablished by the drive device 65.

FIG. 3 shows the embodiment of the electronic video camera 11 shown in FIG. 2 with a substantially longer objective 39' as well as further accessory devices 55, 57, 59, 61, 63. In addition, the shoulder support 41 and the carrier handle 43 are located in a longitudinal position changed with respect to FIG. 2. It can furthermore be recognized in FIG. 3 that the shoulder support 41 has a longitudinal guide 53 which is independent of the first longitudinal guide 31 of the camera body 13 in which the shoulder support 41 is guided. This further longitudinal guide 53 differs in its kind from the longitudinal guides 31, 37 integrated in the camera body 13 in that it is formed as two round bores (shown dashed) in which carrier rods 55 are guided (in the side view in accordance with FIG. 3, the two round bores 53, like the two carrier rods 55, are located behind one another so that only a respective one can be recognized). These carrier rods 55 form a carrier system for the arrangement of different accessory devices such as the shown focus pulling device 57 and the matte box 59 arranged in front of the objective 39'. In addition, a viewfinder holder 61 for an electronic viewfinder 63 is fastened to the carrier handle 43 in FIG. 3.

The center of gravity of the camera 11 is transposed to the front with respect to the state shown in FIG. 2 in the direction of the visual axis S by the long objective 39' and the numerous further accessory devices 55, 57, 59, 61, 63. To compensate this transposition of the center of gravity, the two holding devices, namely the shoulder support 41 and the carrier handle 43, are moved to the front with respect to their longitudinal position with respect to the position shown in FIG. 2 and even partly project beyond the longitudinal extent of the camera body 13. It can thereby be achieved both with respect to a lying of the camera 11 onto a shoulder or onto a tripod by means of the combined shoulder support 51 and with respect to a holding of the camera 11 by means of the carrier handle 43 that a balanced position of equilibrium of the camera 11 is present despite the transposition of the center of gravity.

Furthermore, the shoulder support 41 and the carrier handle 43 with the viewfinder holder 61 can be aligned relative to one another with respect to their respective longitudinal positions such that, when the camera 11 lies on the shoulder of a cameraman, the viewfinder 63 comes to lie in an ergonomically favorable position in front of one eye of the cameraman, with different settings being able to be made for different cameramen. A particularly comfortable operation of the camera 11 is thus possible due to the balanced lying of the camera 11 on the shoulder and due to the flexible setting of the viewfinder position.

Such a balancing of the position of equilibrium of the camera 11 (by adapting the longitudinal position of the shoulder support 41) and a corresponding adaptation of the longitudinal position of the viewfinder 63 are also possible when the viewfinder 63 is held directly in the longitudinal guide 37 via the viewfinder holder 61 movable at the top plate 23, that is not indirectly via the carrier handle 43.

The invention claimed is:

1. An electronic video camera comprising a camera body which has an objective connection for interchangeable objectives as well as at least one side face and one second side face, wherein the objective connection defines a visual axis of the video camera,
wherein a first longitudinal guide, which extends in parallel with the visual axis, is integrated into the first side face of the camera body;
and wherein a second longitudinal guide, which extends in parallel with the visual axis, is integrated into the second side face of the camera body;
wherein the video camera has a first accessory device which can be moved along the first longitudinal guide of the camera body and can be fixed in a variable longitudinal position at the first longitudinal guide; and wherein the video camera has a second accessory device which can be moved along the second longitudinal guide of the camera body and which can be fixed in a variable longitudinal position at the second longitudinal guide;
wherein at least one of the two accessory devices has a holding device which can be moved along the associated longitudinal guide and which can be fixed in a variable longitudinal position such that a balanced position of equilibrium of the video camera can be set when the video camera is held by means of the holding device.

2. The video camera in accordance with claim 1,
wherein the first side face and the second side face lie on opposite sides of the camera body.

3. The video camera in accordance with claim 1,
wherein the first side face is formed by a lower side face of the camera body and the second side face is formed by an upper side face of the camera body.

4. The video camera in accordance with claim 1,
wherein the camera body comprises a housing; and wherein the first side face is a bottom plate of the housing and/or the second side face is a top plate of the housing.

5. The video camera in accordance with claim 1,
wherein the first side face and the second side face of the camera body are formed in one piece with one another.

6. The video camera in accordance with claim 1,
wherein the first longitudinal guide and the second longitudinal guide have the same cross-section profile.

7. The video camera in accordance with claim 1,
wherein the first longitudinal guide and the second longitudinal guide have the same spacing from the visual axis of the video camera.

8. The video camera in accordance with claim 1,
wherein at least one of the named longitudinal guides is formed as a dovetail guide.

9. The video camera in accordance with claim 1,
wherein the width of at least one of the named longitudinal guides corresponds to at least half the width of the associated side face of the camera body.

10. The video camera in accordance with claim 1,
wherein at least one of the named longitudinal guides extends over at most 80% of the length of the associated side face of the camera body.

11. The video camera in accordance with claim 1,
wherein the second longitudinal guide extends over at least a third of the length of the second side face of the camera body.

12. An electronic video camera comprising a camera body which has an objective connection for interchangeable objectives as well as at least one side face and one second side face, wherein the objective connection defines a visual axis of the video camera;
wherein a first longitudinal guide, which extends in parallel with the visual axis, is integrated into the first side face of the camera body;
and wherein a second longitudinal guide, which extends in parallel with the visual axis, is integrated into the second side face of the camera body;
wherein the camera body has a third side face into which a third longitudinal guide is integrated which extends in parallel with the visual axis of the video camera;
wherein the video camera has a first accessory device which can be moved along the first longitudinal guide of the camera body and can be fixed in a variable longitudinal position at the first longitudinal guide; and wherein the video camera has a second accessory device which can be moved along the second longitudinal guide of the camera body and which can be fixed in a variable longitudinal position at the second longitudinal guide;
wherein at least one of the two accessory devices has a holding device which can be moved along the associated longitudinal guide and which can be fixed in a variable longitudinal position such that a balanced- position of equilibrium of the video camera can be set when the video camera is held by means of the holding device.

13. The video camera in accordance with claim 12,
wherein the first longitudinal guide, the second longitudinal guide and the third longitudinal guide each have the same cross-section profile.

14. An electronic video camera comprising a camera body which has an objective connection for interchangeable objectives as well as at least one side face and one second side face, wherein the objective connection defines a visual axis of the video camera;
wherein a first longitudinal guide, which extends in parallel with the visual axis, is integrated into the first side face of the camera body;
and wherein a second longitudinal guide, which extends in parallel with the visual axis, is integrated into the second side face of the camera body;
wherein at least one of the named longitudinal guides has a plurality of engagement sections along its longitudinal extent which define a pattern for a shape-matched fixing of a respective accessory device in different predefined longitudinal positions;
wherein the video camera has a first accessory device which can be moved along the first longitudinal guide of the camera body and can be fixed in a variable longitudinal position at the first longitudinal guide; and wherein the video camera has a second accessory device which can be moved along the second longitudinal guide of the camera body and which can be fixed in a variable longitudinal position at the second longitudinal guide;
wherein at least one of the two accessory devices has a holding device which can be moved along the associated longitudinal guide and which can be fixed in a variable longitudinal position such that a balanced position of equilibrium of the video camera can be set when the video camera is held by means of the holding device.

15. An electronic video camera comprising a camera body which has an objective connection for interchangeable objectives as well as at least one side face and one second side face, wherein the objective connection defines a visual axis of the video camera;
  wherein a first longitudinal guide, which extends in parallel with the visual axis, is integrated into the first side face of the camera body;
  and wherein a second longitudinal guide, which extends in parallel with the visual axis, is integrated into the second side face of the camera body;
  wherein the video camera has a first accessory device which can be moved along the first longitudinal guide of the camera body and can be fixed in a variable longitudinal position at the first longitudinal guide; and wherein the video camera has a second accessory device which can be moved along the second longitudinal guide of the camera body and which can be fixed in a variable longitudinal position at the second longitudinal guide;
  wherein the first accessory device is formed by a first holding device and the second accessory device is formed by a second holding device, with the first holding device being able to be fixed at a lower side face and the second holding device being able to be fixed at an upper side face of the camera body in a variable longitudinal position along the respective longitudinal guide.

16. The video camera in accordance with claim 15,
  wherein the first holding device comprises a shoulder support and/or a tripod connection; and wherein the second holding device comprises a carrier handle and/or a viewfinder holder.

17. The video camera in accordance with claim 15,
  wherein the first holding device comprises a combined shoulder support and tripod connection.

18. The video camera in accordance with claim 15,
  wherein a further longitudinal guide is integrated into the first holding device and extends in parallel with the visual axis of the video camera, the further longitudinal guide being adapted to receive a further accessory device in a variable longitudinal position.

19. The video camera in accordance with claim 15,
  wherein the first longitudinal guide and the second longitudinal guide have the same cross-section profile.

20. The video camera in accordance with claim 15,
  wherein the first longitudinal guide and the second longitudinal guide have the same spacing from the visual axis of the video camera.

21. An electronic video camera comprising a camera body which has an objective connection for interchangeable objectives as well as at least one side face and one second side face, wherein the objective connection defines a visual axis of the video camera;
  wherein a first longitudinal guide, which extends in parallel with the visual axis, is integrated into the first side face of the camera body;
  and wherein a second longitudinal guide, which extends in parallel with the visual axis, is integrated into the second side face of the camera body;
  wherein the video camera has a first accessory device which can be moved along the first longitudinal guide of the camera body and can be fixed in a variable longitudinal position at the first longitudinal guide; and wherein the video camera has a second accessory device which can be moved along the second longitudinal guide of the camera body and which can be fixed in a variable longitudinal position at the second longitudinal guide;
  wherein the first accessory device and the second accessory device are mechanically connected to one another.

22. An electronic video camera comprising a camera body which has an objective connection for interchangeable objectives as well as at least one side face and one second side face, wherein the objective connection defines a visual axis of the video camera;
  wherein a first longitudinal guide, which extends in parallel with the visual axis, is integrated into the first side face of the camera body;
  and wherein a second longitudinal guide, which extends in parallel with the visual axis, is integrated into the second side face of the camera body;
  wherein the video camera has a first accessory device which can be moved along the first longitudinal guide of the camera body and can be fixed in a variable longitudinal position at the first longitudinal guide; and wherein the video camera has a second accessory device which can be moved along the second longitudinal guide of the camera body and which can be fixed in a variable longitudinal position at the second longitudinal guide;
  wherein at least one of the named accessory devices has a drive device to move the accessory device along the respective longitudinal guide with respect to a longitudinal arrangement.

23. An electronic video camera comprising a camera body which has an objective connection for interchangeable objectives as well as at least one side face and one second side face, wherein the objective connection defines a visual axis of the video camera;
  wherein a first longitudinal guide, which extends in parallel with the visual axis, is integrated into the first side face of the camera body;
  and wherein a second longitudinal guide, which extends in parallel with the visual axis, is integrated into the second side face of the camera body;
  wherein at least one of the named longitudinal guides has a drive device to move a respective accessory device guided in the longitudinal guide with respect to a longitudinal arrangement;
  wherein the video camera has a first accessory device which can be moved along the first longitudinal guide of the camera body and can be fixed in a variable longitudinal position at the first longitudinal guide; and wherein the video camera has a second accessory device which can be moved along the second longitudinal guide of the camera body and which can be fixed in a variable longitudinal position at the second longitudinal guide;
  wherein at least one of the two accessory devices has a holding device which can be moved along the associated longitudinal guide and which can be fixed in a variable longitudinal position such that a balanced position of equilibrium of the video camera can be set when the video camera is held by means of the holding device.

24. The video camera in accordance with claim 23,
  wherein the drive device is adapted to read out positional data associated with a respective accessory device from a memory device and to move the respective accessory device in dependence on the associated positional data with respect to a longitudinal arrangement.

* * * * *